(12) United States Patent
Hartmann

(10) Patent No.: US 6,574,874 B2
(45) Date of Patent: Jun. 10, 2003

(54) MACHINE TOOL FOR CUTTING WORK

(75) Inventor: Markus Hartmann, Mauerstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/894,740

(22) Filed: Jun. 28, 2001

(65) Prior Publication Data

US 2002/0000046 A1 Jan. 3, 2002

(30) Foreign Application Priority Data

Jul. 3, 2000 (DE) .......................................... 100 32 294

(51) Int. Cl.[7] .......................... B23D 45/16; B23D 45/14
(52) U.S. Cl. ...................................................... 30/376
(58) Field of Search .......................... 30/376, 377, 375, 30/391

(56) References Cited

U.S. PATENT DOCUMENTS 2,544,461 A * 3/1951 Leitzel .......................... 30/376
5,517,763 A * 5/1996 Schilling et al. ............... 30/376

* cited by examiner

*Primary Examiner*—Douglas D. Watts
(74) *Attorney, Agent, or Firm*—Sidley Austin Brown & Wood, LLP

(57) ABSTRACT

A machine tool, with a stop plate (2, 21), a working unit having a disk-shaped cutting tool (1, 17) and a driving mechanism (3), is connected pivotally with the stop plate (2, 21) for making angular and miter cuts. By means of several connecting link guides (4), mounted at the stop plate (2, 21), it is ensured that the cutting characteristics of the machine tool are independent of the pivoted position.

3 Claims, 3 Drawing Sheets

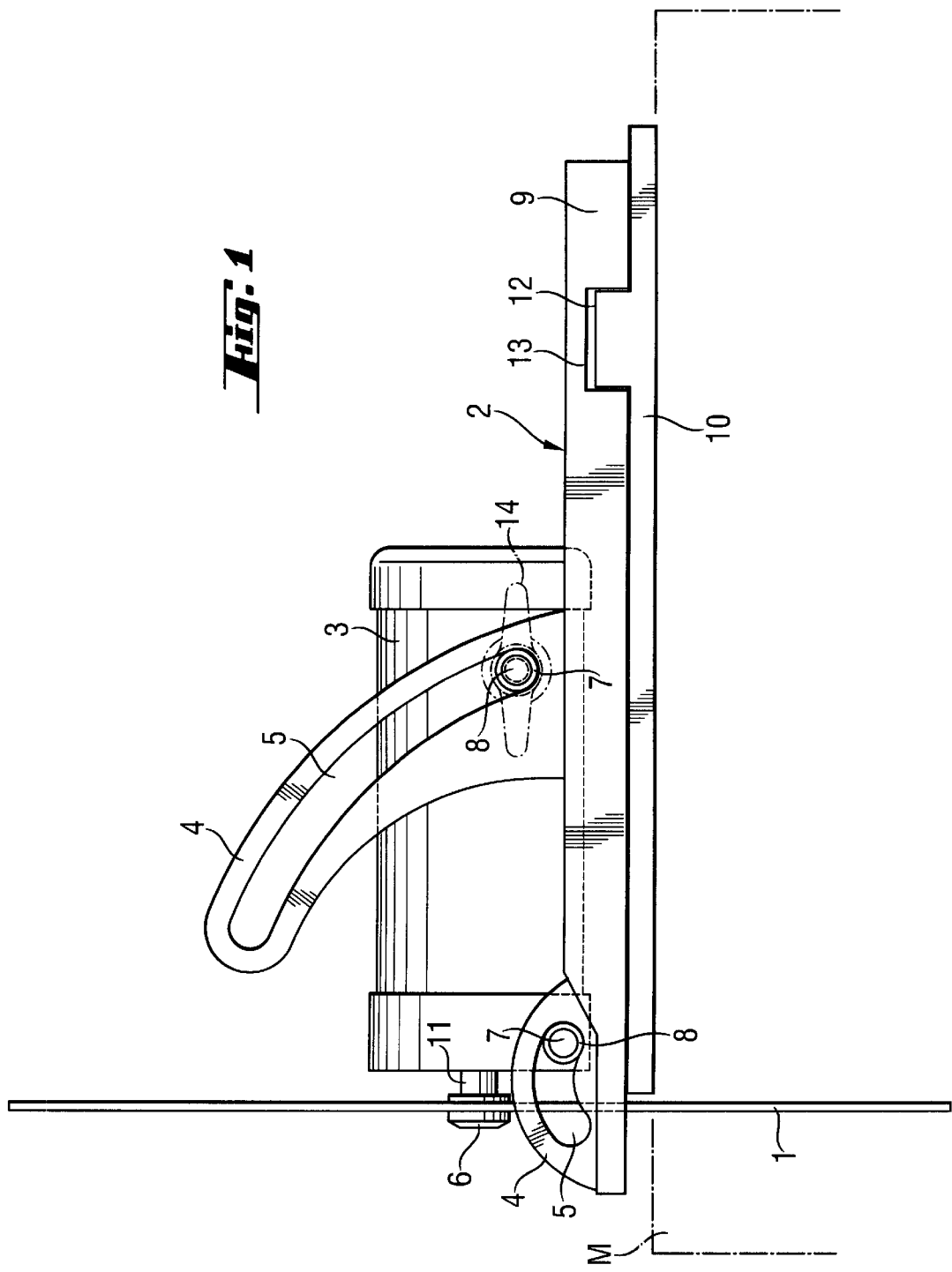

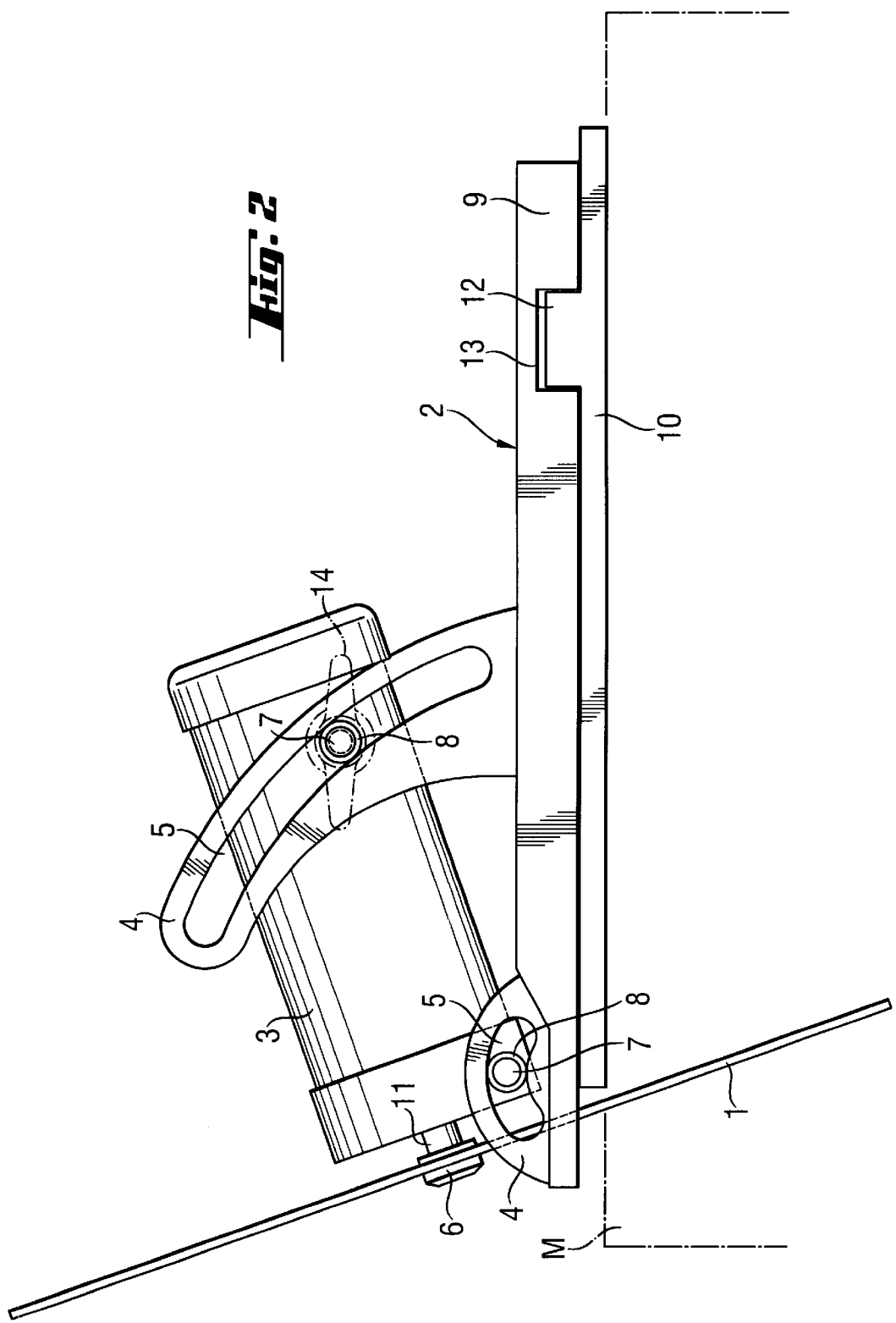

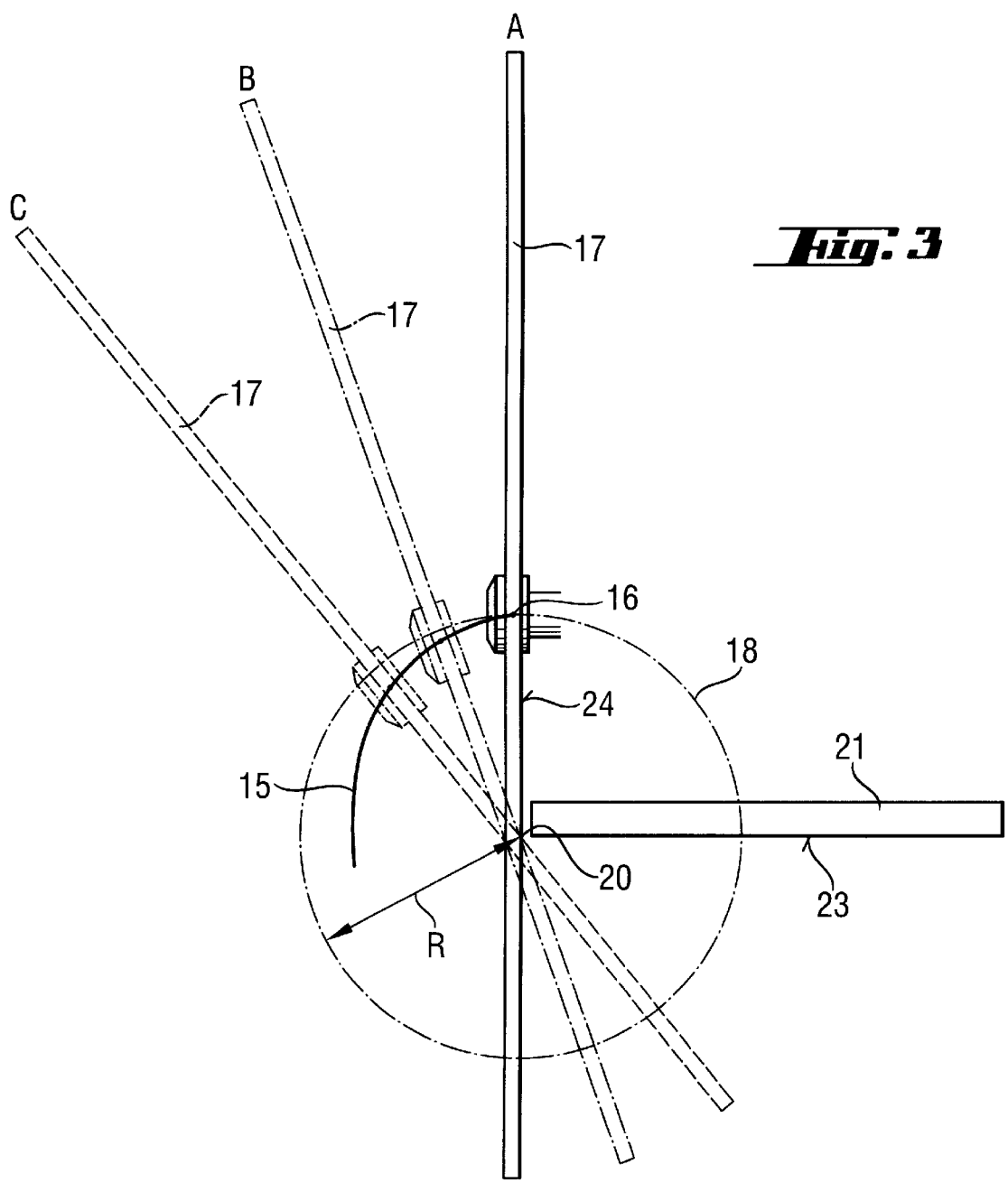

MACHINE TOOL FOR CUTTING WORK

BACKGROUND OF INVENTION

The invention relates to a machine tool, such as a manually operable circular saw, with a stop plate, a disk-shaped cutting tool and a working unit having a driving mechanism, which working unit, for carrying out angular cuts and miter cuts, is connected pivotally and, in the respective pivoted position, fixably with the stop plate, the latter, in a first or starting position, being at right angles to the cutting tool and, in the first position, the side of the stop plate, facing away from the driving mechanism, intersects on an intersection line with the side of the cutting tool facing the driving mechanism.

A machine tool, especially in the form of a manually operable circular saw, is used for cutting solid materials, which are to be worked, such as wood, concrete or the like, or of milling at least a cutting line in the surface of the material. For guidance, the machine tool has a stop plate, which guides a working unit, having a cutting tool, on the surface of the material that is to be worked. The stop plate may have additional guiding means, such as a stop angle, in order to make precise guidance of the cutting tool easier. For carrying out angular or miter cuts in the material, the working unit is connected pivotally and fixably in the respective pivoted position with the stop plate. By these means, the user of the machine tool is also able to make cuts transversely to the surface, that is, at an angle different from 90° to the surface. For driving the cutting tool, the working unit has a driving mechanism, such as an electric motor.

A machine tool, especially a manually operable circular saw of the type mentioned is known, for example, from the DE 4124231 A1 and consists of a stop plate, a disk-shaped cutting tool and a working unit having a driving mechanism. For carrying out angular or miter cuts, the working unit is connected pivotally and fixably in the respective pivoted position with the stop plate. A connecting link guide, which has locking screws for fixing is fastened to the stop plate. The depth of cut of the cutting tool in relation to the stop plate is fixed by an elongated hole with a locking screw. The connecting link guide of the known machine tool is designed so that the pivoting axis of the cutting tool, fixed in any pivoted position, is below the surface of the material.

It is a disadvantage of the known solution that the cutting characteristics, particularly the depth of cut and the position of the cutting line, unless readjusted, change as the pivoting of the working unit with respect to the stop plate increases. Especially the depth of cut is decreased by the pivoting movement. This defect can be compensated for, at least partly and with an expenditure of much time, by readjustment.

SUMMARY OF THE INVENTION

It is an object of the present invention to provide a machine tool, such as a manually operable circular saw, with a pivotal working unit, which is convenient and requires no adjustment for achieving the same cutting characteristics in any pivoted position of the working unit, particularly of the cutting tool.

Pursuant to the invention, this objective is accomplished by the fact that, during pivoting, the center of the cutting tool moves on a geometric path within a cylinder, the central axis of which forms the cutting line and the radius of which corresponds to the distance between the cutting line and the center of the cutting tool in the first or starting position.

Accordingly, on the one hand, a decrease in the depth of cut is prevented and, on the other, the geometric path can be selected so that the cutting line is independent of the pivoting angle. For example, the geometric path is selected so that the cutting tool glides, as it were, into the material to be worked along the cutting line. Furthermore, by guiding the center of the cutting tool on a geometric path, it is ensured that the adjustment of the pivoted position of the working unit is convenient, since the position of the center of the cutting tool is specified clearly in each pivoted position. As a result, furthermore, faulty manipulation by the adjustment in the extreme regions is impossible. The geometric path can be optimized depending on the application purpose. For example, a constant depth of cut or a maximum depth of cut can be attained at any pivoted angle. The inventive solution is suitable for stationary machine tools as well as for non-stationary machine tools, especially for manually operable circular saws.

Advantageously, for guiding the working unit, the stop plate has several connecting link guides with elongated holes, in order to guarantee that the manufacture is simple and economic. Furthermore, a reliable and exact guidance of the working unit is ensured by this embodiment.

Moreover, the elongated holes preferably are formed along circular arcs. By these means, easy adjustability is ensured which, in turn, leads to greater convenience. In special cases, a deviating construction of the elongated holes, such as an elliptical shape, can be selected for the elongated holes.

In order to compensate for manufacturing tolerances, the working unit can be fixed to the stop plate by bolts, which have a plastic sleeve. Due to its elasticity, the plastic sleeve compensates for manufacturing tolerances in the elongated holes and connecting link guides. Of course, other elastic materials can also be used instead of plastic.

The various features of novelty which characterize the invention are pointed out with particularity in the claims annexed to and forming a part of this disclosure. For a better understanding of the invention, its operating advantages and specific objects attained by it use, references should be had to the drawings and description matter in which there are illustrated and described preferred embodiments of the invention.

BRIEF DESCRIPTION OF THE DRAWINGS

The invention is described below by means of an example. In the drawings,

FIG. 1 shows a side view of an tool machine, embodying the invention, in the starting position;

FIG. 2 shows the tool machine, illustrated in FIG. 1, in a pivoted position, and FIG. 3 shows a diagrammatic representation of the geometric path of a center of a cutting tool of the inventive tool machine in an end view.

DETAILED DESCRIPTION OF THE INVENTION

In FIGS. 1 and 2, a machine tool embodying the invention, such as a manually operable circular saw, is shown, with a stop plate 2, a disk-shaped cutting tool 1 and a mechanism 3 for driving the tool. For carrying out angular and miter cuts, a working unit is connected pivotally and fixably in the respective pivoted position with the stop plate 2, as is shown particularly in FIG. 2. In FIG. 1, the machine tool is shown in a first or starting position, which is distinguished by the fact that the stop plate 2 is at right angles to the cutting tool 1.

For transferring a torque, the driving mechanism 3 is connected by a shaft 11 with the center of the cutting tool 1. The cutting tool 1 is fastened detachably to the shaft 11 by means of a fastener 6, such as a nut.

The stop plate 2 has a guiding rail 10 and a crosshead guide 9. The guiding rail 10 is detachably connected with the surface of a material M, which is to be worked, and has a guiding path 12, which ensures precise guidance of the working unit, especially of the cutting tool 1. At its surface facing away from the driving unit 3, the crosshead guide 9 has a groove 13, which is constructed complementarily to the guiding path, so that the crosshead guide 9 can slide in the working direction on the guiding rail 10. Furthermore, the stop plate 2, especially the crosshead guide 9, has connecting link guides 4, for pivoting the working unit. The working unit is guided in circularly arcuate elongated holes 5 of the connecting link guide 4 by bolts 7, mounting the driving mechanism 3. In order to correct for manufacturing tolerances of the connecting link guide 4 and of the elongated holes 5, the bolts 7 have plastic sleeves 8, which can be deformed within a certain range. Bolts 7, which are provided with an external thread and on which a wing nut 14 is screwed, are provided for fixing the working unit in any pivoted position, as is shown, in particular, in FIG. 2. By loosening the wing nuts, the working unit can be pivoted and, by tightening the wing nuts, fixed once again. In order to ensure that the working unit is securely fixed temporarily, it has two bolts 7 on the side facing and two bolts 7 on the side facing away from the working direction. In FIGS. 1 and 2, only the two bolts 7, facing the working direction, are shown.

In FIG. 3, a diagrammatic representation of a geometric path 15 of a center 16 of a cutting tool 17 is reproduced. In a first or starting position A, as shown in FIG. 1, the surface 23 of a stop plate 21, facing away from the driving mechanism that is not shown, intersects with the side 24 of a cutting tool 17, facing the driving mechanism, at a line of intersection 20. The geometric path 15 is within a cylinder 18, the center axis of which forms the line of intersection 20 and the radius R of which corresponds to the distance between the line of intersection 20 and the center 16 of the cutting tool 17 in the starting position A. The greater the angle between the cutting tool 17 in the starting position A and an inclined position B and C, the more does the center 16 of the pivoted cutting tool 17 approach the center axis of the cylinder 18. The side 24 of the cutting tool 17 remains in contact with the line of intersection 20 in any pivoted position.

What is claimed as new and desired to be protected by letters patent is set forth in the appended claims.

What is claimed is:

1. A machine tool, such as a manual circular saw, comprising a plate (2), a disk-shaped cutting tool (1,17) and a working unit mounting said cutting tool and including a mechanism (3) for driving said cutting tool (1,17), said driving mechanism (3) having a length extending transversely of said cutting tool (1,17), said working unit is pivotally displaceable relative to and fixable to said stop plate (2), said stop plate (2) having a first surface mounting said working unit and an oppositely facing second surface, said disk-shaped cutting tool (1,17) having a first side facing said driving mechanism (3), said first side of said cutting tool (1,17) and said second surface of said stop plate (2) being perpendicular to one another in a first position of said cutting tool (1, 17), said first side of said cutting tool intersects along an intersection line (20) with said second surface of said plate, wherein during pivoting of said working unit said cutting tool (1, 17) having a center (16) moving on a geometric path (15) within a cylinder (18) having a center axis extending along the intersection line (20) and a radius (R) corresponding to the distance between the intersection line (20) and the center (16) of the cutting tool, said stop plate (2,21) has several connecting link guides (4) extending generally in the length direction of said driving mechanism (3), said connecting link guides having elongated holes (5) extending generally in the length direction of said driving mechanism (3).

2. A machine tool, as set forth in claim 1, wherein said elongated holes (5) are curved in the elongated direction.

3. A machine tool, as set forth in claim 1, wherein the working unit is secured to the stop plate (2, 21) by bolts (7) extending through said elongated holes (5), and said bolts are enclosed in plastic sleeves (8).

* * * * *